US 8,208,418 B1

(12) United States Patent
Grosser, Jr. et al.

(10) Patent No.: US 8,208,418 B1
(45) Date of Patent: Jun. 26, 2012

(54) METHODS, SYSTEMS, AND COMPUTER READABLE MEDIA FOR CONSERVING MULTICAST PORT LIST RESOURCES IN AN INTERNET PROTOCOL (IP) PACKET FORWARDING DEVICE

(75) Inventors: Donald B. Grosser, Jr., Apex, NC (US); Michael D. Mroz, Fuquay-Varina, NC (US); Hood L. Richardson, Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 125 days.

(21) Appl. No.: 12/355,756

(22) Filed: Jan. 16, 2009

(51) Int. Cl.
*H04H 20/71* (2008.01)
(52) U.S. Cl. ......... 370/312; 370/390; 370/432; 370/473
(58) Field of Classification Search .................. 370/312, 370/390, 432, 473
See application file for complete search history.

(56) References Cited

U.S. PATENT DOCUMENTS

| | | | | | |
|---|---|---|---|---|---|
| 5,513,335 | A | * | 4/1996 | McClure | 711/130 |
| 5,574,860 | A | * | 11/1996 | Perlman et al. | 709/220 |
| 5,602,841 | A | * | 2/1997 | Lebizay et al. | 370/413 |
| 5,959,968 | A | * | 9/1999 | Chin et al. | 370/216 |
| 6,272,133 | B1 | * | 8/2001 | Bialkowski et al. | 370/389 |
| 6,370,142 | B1 | * | 4/2002 | Pitcher et al. | 370/390 |
| 6,614,787 | B1 | * | 9/2003 | Jain et al. | 370/390 |
| 6,711,163 | B1 | * | 3/2004 | Reid et al. | 370/390 |
| 6,771,673 | B1 | * | 8/2004 | Baum et al. | 370/535 |
| 6,898,189 | B1 | * | 5/2005 | Di Benedetto et al. | 370/256 |
| 6,950,431 | B1 | * | 9/2005 | Nozaki et al. | 370/390 |
| 6,977,891 | B1 | * | 12/2005 | Ranjan et al. | 370/229 |
| 7,283,525 | B2 | * | 10/2007 | Burgess et al. | 370/392 |
| 7,304,996 | B1 | * | 12/2007 | Swenson et al. | 370/394 |
| 7,443,852 | B2 | * | 10/2008 | Kwon et al. | 370/390 |
| 7,480,295 | B2 | * | 1/2009 | Sung et al. | 370/390 |
| 7,590,120 | B2 | * | 9/2009 | Shuen et al. | 370/392 |
| 7,646,773 | B2 | * | 1/2010 | Na et al. | 370/395.31 |
| 7,949,662 | B2 | * | 5/2011 | Farber et al. | 707/747 |
| 2002/0009083 | A1 | * | 1/2002 | Ambe et al. | 370/390 |

(Continued)

OTHER PUBLICATIONS

Co-pending U.S. Appl. No. 12/973,417, filed Dec. 20, 2010.

(Continued)

*Primary Examiner* — Kwang B Yao
*Assistant Examiner* — Benjamin H Elliott, IV
(74) *Attorney, Agent, or Firm* — Jenkins, Wilson, Taylor & Hunt, P.A.

(57) ABSTRACT

The subject matter described herein includes methods and systems for conserving multicast port lists in an IP packet forwarding device. According to one embodiment, the method includes providing an IP multicast packet port data structure containing at least a first port list and a second port list. The first and second port lists each contain zero or more port addresses for indicating the ports to which a received IP multicast packet including a group IP address is to be forwarded. An IP multicast packet forwarding database (FDB) is provided where the FDB has at least a first FDB entry and a second FDB entry for forwarding the received IP multicast packet based on its group IP address. The first and second FDB entries each include at least one multicast group IP address and are associated with at least one of the first and the second port lists. It is then determined whether the first and second port lists contain identical information. In response to determining that the first and second port lists contain identical information, the first and second FDB entries are associated with the first port list and hardware resources associated with the second port list are released.

18 Claims, 6 Drawing Sheets

U.S. PATENT DOCUMENTS

| | | | |
|---|---|---|---|
| 2002/0099857 A1* | 7/2002 | Lowe et al. | 709/250 |
| 2005/0041680 A1* | 2/2005 | Tanaka et al. | 370/432 |
| 2005/0083839 A1* | 4/2005 | Singh et al. | 370/230 |
| 2006/0050717 A1* | 3/2006 | Lepakshaiah et al. | 370/400 |
| 2006/0056427 A1* | 3/2006 | Sato | 370/401 |
| 2007/0038743 A1* | 2/2007 | Hellhake et al. | 709/224 |
| 2007/0043695 A1* | 2/2007 | Bare et al. | 707/2 |
| 2007/0127459 A1* | 6/2007 | Lo et al. | 370/389 |
| 2007/0195793 A1* | 8/2007 | Grosser et al. | 370/395.53 |

OTHER PUBLICATIONS

"Summit® X480 Series," Extreme Networks Data Sheet, pp. 1-16 (Copyright 2010).

"Summit® X450 Series," Extreme Networks Data Sheet, pp. 1-10 (Copyright 2007).

Albanna et al., "IANA Guidelines for IPv4 Multicast Address Assignments," Network Working Group RFC 3171 (Aug. 2001).

* cited by examiner

METHODS, SYSTEMS, AND COMPUTER READABLE MEDIA FOR CONSERVING MULTICAST PORT LIST RESOURCES IN AN INTERNET PROTOCOL (IP) PACKET FORWARDING DEVICE

TECHNICAL FIELD

The subject matter described herein relates to forwarding multicast packets. More particularly, the subject matter described herein relates to methods, systems, and computer readable media for conserving multicast port list resources in an IP packet forwarding device.

BACKGROUND

In unicast routing or packet forwarding, traffic is routed through a network along a single path from the source to the destination host. At each hop along the path, a layer 3 packet forwarding device, such as a router, scans through its routing table for the destination address included in the packet and forwards a single copy of the packet to an outgoing interface (e.g., port) in the direction of the destination host. A layer 2 packet forwarding device also performs a unicast packet forwarding function when it forwards a layer 2 packet to a single destination in response to a match in a layer 2 forwarding table lookup where the matching entry corresponds to a single unicast destination.

In contrast, multicast routing or packet forwarding allows a source host to send packets to a group of destination hosts without requiring that the source hosts copy the packet and send each copy individually to each destination. In layer 3 devices, multicast routing is accomplished by reserving a subset of the IP address space for multicast addresses which are not associated with individual hosts. Instead, multicast packets received by forwarding devices (e.g., routers) are examined and, if the downstream path to members of the multicast group diverge, the router replicates the packet and forwards each copy to the downstream paths. Importantly, the replication of multicast packets is targeted only to those hosts that are members of the multicast group. This contrasts with broadcast delivery of packets which simply replicates and forwards a received packet to all outgoing ports. Thus, layer 3 IP multicast implementations provide for the delivery of source traffic to multiple recipients by replicating multicast packets in the network at the point where paths diverge. Multicast routing therefore results in more efficient delivery of data to multiple recipients compared to other methods (i.e., unicast, broadcast) because packets are delivered only to intended destination hosts without burdening the source host with replicating the packet for delivery each destination host. In layer 2 devices, multicast packet forwarding is accomplished via Internet group management protocol (IGMP) snooping, which will be described in more detail below.

A multicast group is an arbitrary group of hosts (i.e., destinations) wishing to receive a particular packet data stream. A multicast group is a logical grouping that has no physical or geographical boundaries. A host wishing to receive data flowing to a particular group may join a multicast group using a multicast protocol, such as IGMP. As mentioned above, IP multicast addresses specify a set of IP hosts that have joined a group and are interested in receiving multicast traffic designated for that particular group. According to RFC 3171, which is incorporated by reference herein in its entirety, addresses 224.0.0.0 through 239.255.255.255 are designated as multicast addresses. Therefore, if a host wishes to become a member of a multicast group, the sender sends a single datagram to a valid multicast address and intermediary routers copy the packet and send the copies to members of the multicast group.

In order to perform multicast forwarding, conventional layer 3 forwarding devices typically include a forwarding database (FDB) and a port list data structure whose entries are associated in a 1:1 correspondence. For example, each FDB entry typically contains the source IP address of the sender and the group IP addresses for each learned multicast group. FDB entries may also include VLAN identifiers for specifying a VLAN, may only include the group identifier, or may include combinations of the above information. The port list data structure typically includes a plurality of port lists that include a list of outgoing port identifiers indicating the ports to which a received multicast packet should be forwarded. Port lists may also include VLAN identifiers in addition to port identifiers.

Conventional layer 3 multicast forwarding devices typically implement the FDB and the port list data structure using independent hardware structures/resources. For example, the port list data structure may be stored in a first memory and the FDB may be stored in a second memory, with entries in the FDB memory having pointers to memory locations in the port list memory.

One problem associated with conventional IP multicast forwarding devices is that the capacity of the port list data structure can become a resource bottleneck under some conditions. For example, the port list data structure may be limited in the number of port lists, the number of ports per list, and/or the total number of ports across all lists supported. Thus, in networks where a large number of hosts send multicast traffic to the same multicast destinations, port lists stored in the port list data structure may include redundant information. As a result, port list hardware resources may become full and subsequent FDB entries cannot be added. When FDB entries can no longer be added because no port list resources are available, CPU slowpath processing may be used. However, because it is desirable for layer 3 forwarding devices to perform multicast forwarding quickly, it is desirable to limit the amount of slowpath processing performed.

Accordingly, a need exists for improved methods and systems for conserving multicast port list resources in layer 3 forwarding devices.

SUMMARY

The subject matter described herein includes methods and systems for conserving multicast port lists in an IP packet forwarding device. According to one embodiment, the method includes providing an IP multicast packet port data structure containing at least a first port list and a second port list. The first and second port lists each contain zero or more port addresses for indicating the ports to which a received IP multicast packet including a group IP address is to be forwarded. An IP multicast packet forwarding database (FDB) is provided where the FDB has at least a first FDB entry and a second FDB entry for forwarding the received IP multicast packet based on its group IP address. The first and second FDB entries each include at least one multicast group IP address and are associated with at least one of the first and the second port lists. It is then determined whether the first and second port lists contain identical information. In response to determining that the first and second port lists contain identical information, the first and second FDB entries are associated with the first port list and hardware resources associated with the second port list are released.

An IP packet forwarding device for conserving multicast port lists is also disclosed. According to one embodiment, the packet forwarding device includes an IP multicast packet port list data structure and IP multicast packet forwarding database (FDB). The IP multicast packet port list data structure contains at least a first port list and a second port list, where the first and second port lists each contain one or more port addresses for indicating the ports to which a received IP multicast packet is to be forwarded. The IP multicast packet FDB contains at least a first FDB entry and a second FDB entry for forwarding the received IP multicast packet based on its group (and possibly its source) IP address. The first and second FDB entries each include at least one multicast group IP address and are associated with at least one of the first and the second port lists. A port list conservation module determines whether the first and second port lists contain identical information and, in response to determining that the first and second port lists contain identical information, associates the first and second FDB entries with the first port list and releases hardware resources associated with the second port list. It is appreciated that the IP packet forwarding device may include either a layer 3 forwarding device, such as a router, or may include a layer 2 forwarding device, such as a switch, with IGMP snooping enabled.

The subject matter described herein for conserving multicast port lists in an IP packet forwarding device may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a call described herein. In addition, a computer readable medium that implements the subject matter described herein may be distributed across multiple physical devices and/or computing platforms.

As used herein, the term "vport" refers to a combination of a VLAN identifier and a port identifier. A vport may be written as <vlan>, <port>.

DETAILED DESCRIPTION

As described above, conventional layer 3 forwarding devices provide a 1:1 association between FDB entries and port lists. As such, port list hardware resource limitations may prevent the addition of new FDB entries. Accordingly, the subject matter described herein includes methods and systems for allowing multiple IP multicast FDB entries to share a single hardware port list structure. One advantage of allowing multiple IP multicast FDB entries to share a single hardware port list structure is that port list resources are conserved and more FDB entries may be stored in hardware, resulting in faster multicast packet forwarding.

Figure 1:
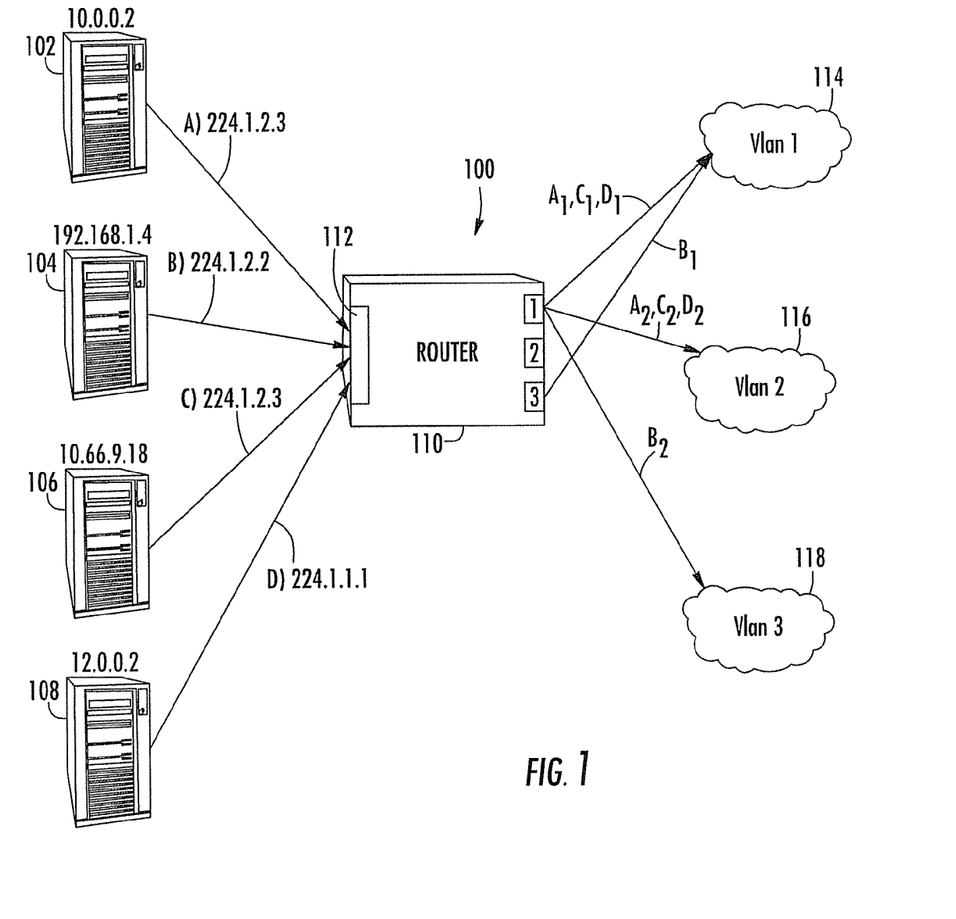
FIG. 1 is a network diagram of an exemplary network for forwarding multicast packets to multiple VLANs according to an embodiment of the subject matter described herein.

FIG. 1 is a network diagram showing multicast packet forwarding. Referring to FIG. 1, network 100 may include a packet-based network such as an Internet protocol (IP) network for routing multicast IP packets. Network 100 may include four originating network devices 102, 104, 106, and 108 that are each capable of sending multicast packets. In the exemplary network shown, originating device 102 may have a source IP address of 10.0.0.2, device 104 may have a source IP address of 192.168.1.4, device 106 may have a source IP address of 10.66.9.18, and device 108 may have a source IP address of 12.0.0.2.

In order to send a multicast packet, a network device sends the packet to an IP multicast address or "group address." As described above, the multicast group IP address does not correspond to a single, unique host in an IP network. For example, devices 102-108 may each send multicast packets to multicast destinations through router 110. Specifically, router 110 may receive multicast packet A for group address 224.1.2.3 at its incoming port 112. Device 104 may send multicast packet B to group address 224.1.2.2 to router 110. Device 106 may send multicast packet C to group address 224.1.2.3 to router 110. Finally, device 108 may send multicast packet D to group address 224.1.1.1 to router 110.

Upon receiving multicast messages A, B, C, and D, router 110 may perform a lookup in a layer 3 forwarding database (FDB) for an entry matching the source IP address and multicast group IP address of each multicast packet received. However, it is appreciated that router 110 may also perform a lookup in the FDB for an entry matching the group IP address alone or variously in combination with a VLAN identifier and source IP address without departing from the scope of the subject matter described herein. For the sake of simplicity, no VLAN identifier is shown for multicast messages A-D shown in FIG. 1.

Conventionally, each FDB entry may be associated with a single corresponding entry in a port list data structure, where port list resources are separate from FDB resources. A lookup performed in the FDB may be used to locate an associated port list. The port list may contain a listing of one or more ports and, optionally, VLAN identifiers used for forwarding multicast packet to their destinations. For example, router 110 may include outgoing ports 1, 2, and 3 for delivering packets to devices belonging to VLANs 114, 116, and 118. In the exemplary scenario shown in FIG. 1, based on the FDB/port list lookup performed by router 110, multicast packets A, C, and D are replicated to create packets $A_1$, $C_1$, $D_1$ and $A_2$, $C_2$, $D_2$. This is because each of the port lists associated with received multicast packet A, C, and D include two different destination VLANs and/or outgoing port identifiers. Specifically, packets $A_1$, $C_1$, and $D_1$ are forwarded to VLAN1 114 on port 1 and packets $A_2$, $C_2$, $D_2$ are forwarded to VLAN2 114 on port 1. Lastly, multicast packet B is replicated into packets $B_1$ and $B_2$ because the port lists associated with received multicast packet B also includes two different destination VLANs and/or outgoing port identifiers. However, in contrast to packets A, C, and D, multicast packet B is forwarded to the same destination using a different port and to a different destination VLAN using the same port. Specifically, packet $B_1$ is forwarded to VLAN1 114 on port 3 and packet $B_2$ is forwarded to VLAN3 118 on port 1.

Figure 2:
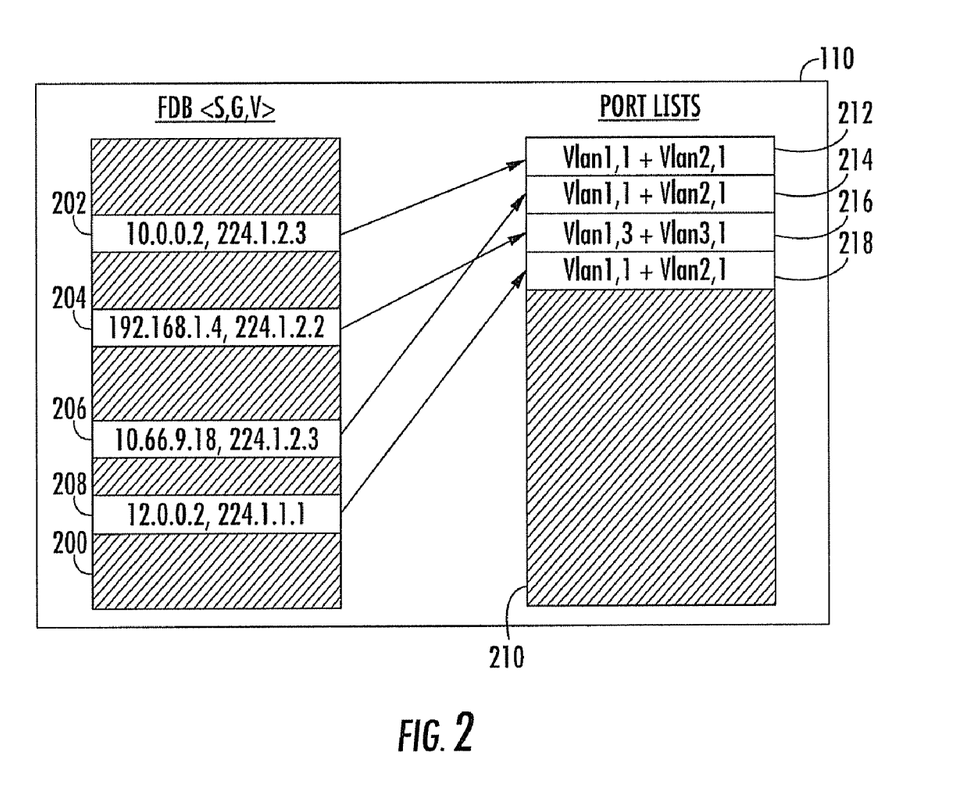
FIG. 2 is a diagram of an exemplary layer 3 forwarding device including a conventional forwarding database and port list data structure including redundant multicast port lists.

FIG. 2 is a diagram of a conventional FDB and port list data structure for implementing conventional IP multicast forwarding. As mentioned above, each entry in a conventional FDB is associated with a single port list in the port list data structure in a 1:1 correlation. As such, the port list data structure may often contain multiple, redundant port lists. An example of this is shown in FIG. 2. Referring to FIG. 2, layer 3 IP multicast forwarding device 110 may include FDB 200 and port list data structure 210. FDB 200 and port list data structure 210 may utilize separate hardware resources, such as a first memory and a second memory (e.g., random access memory (RAM)). FDB 200 may contain one or more FDB entries being associated with different group IP addresses or different combinations of group IP addresses, source IP addresses, and/or VLAN identifiers. FDB entry 202 may include source IP address 10.0.0.2/group IP address 224.1.2.3, FDB entry 204 may include source IP address 192.168.1.4/group IP address 224.1.2.2, FDB entry 206 may include source IP address 10.66.9.18/group IP address 224.1.2.3, and FDB entry 208 may include source IP address 12.0.0.2/group IP address 224.1.1.1. Thus, it is appreciated that FDB entries 202 and 206 are each associated with the same group IP address (i.e., 224.1.2.3).

Port list data structure 210 may contain one or more port lists 212, 214, 216, and 218 containing a plurality of port identifiers (hereinafter, "ports") or vports (i.e., VLAN IDs and ports) used to forward multicast packets to next hop destinations. Each port list may be associated with an FDB entry 202-208, where only one FDB entry is associated with each port list. Thus, a lookup performed for FDB entry 202 would result in port list 212, a lookup for FDB entry 204 would result in port list 216, a lookup for FDB entry 206 would result in port list 214, and a lookup for FDB entry 208 would result in port list 218.

As can be seen from FIG. 2, port lists 210 may include redundant (i.e., duplicated) information. For example, port lists 212, 214, and 218 include vlan 1, port 1 and vlan 2, port 1. As a result, hardware resources associated with storing port list data structure 210 may be inefficiently utilized because three port lists are used to store information that may be included in one port list.

Figure 3:
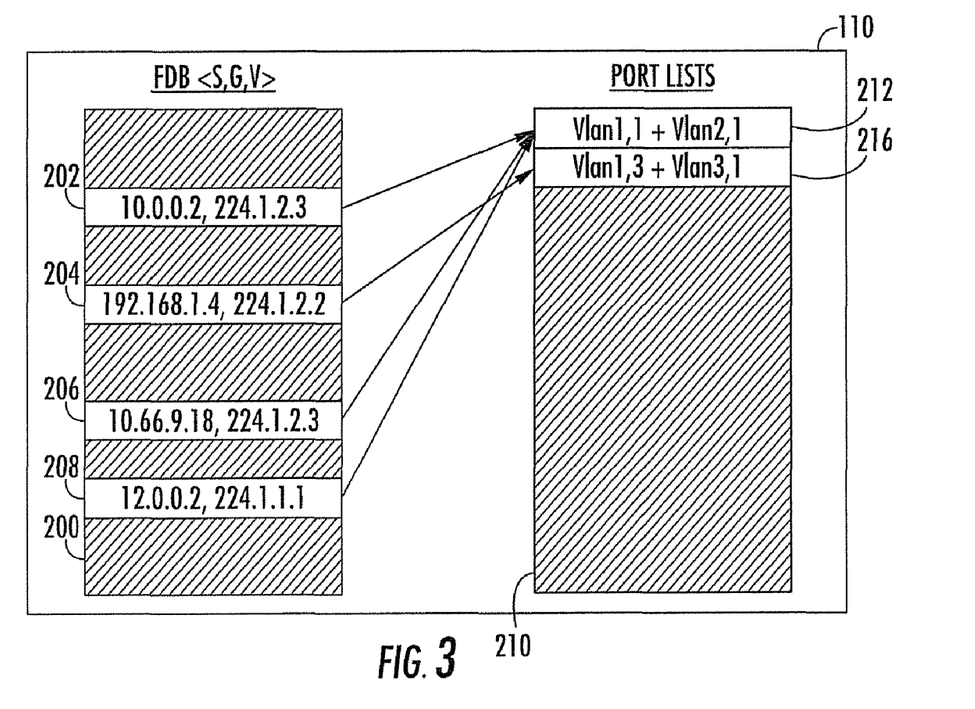
FIG. 3 is a diagram of an exemplary a layer 3 forwarding device including a forwarding database and port list data structure for conserving multicast port lists according to an embodiment of the subject matter described herein.

FIG. 3 is a diagram of an exemplary multicast forwarding device wherein multiple FDB entries are associated with a single port list data structure for conserving port list resources according to an embodiment of the subject matter described herein. Referring to FIG. 3, layer 3 forwarding device 110 may determine whether port lists stored in port list data structure include redundant port lists and therefore may be combined. For example, an examination of port list data structure 210 determines that port lists 212, 214, and 218 include identical port forwarding information and therefore may be combined into a single port list 212 which is associated with multiple FDB entries 202, 206, and 208. As a result, the size of port list data structure 210 may be reduced by 50% compared with the embodiment shown in FIG. 2 (i.e., from four entries to two).

Figure 4:
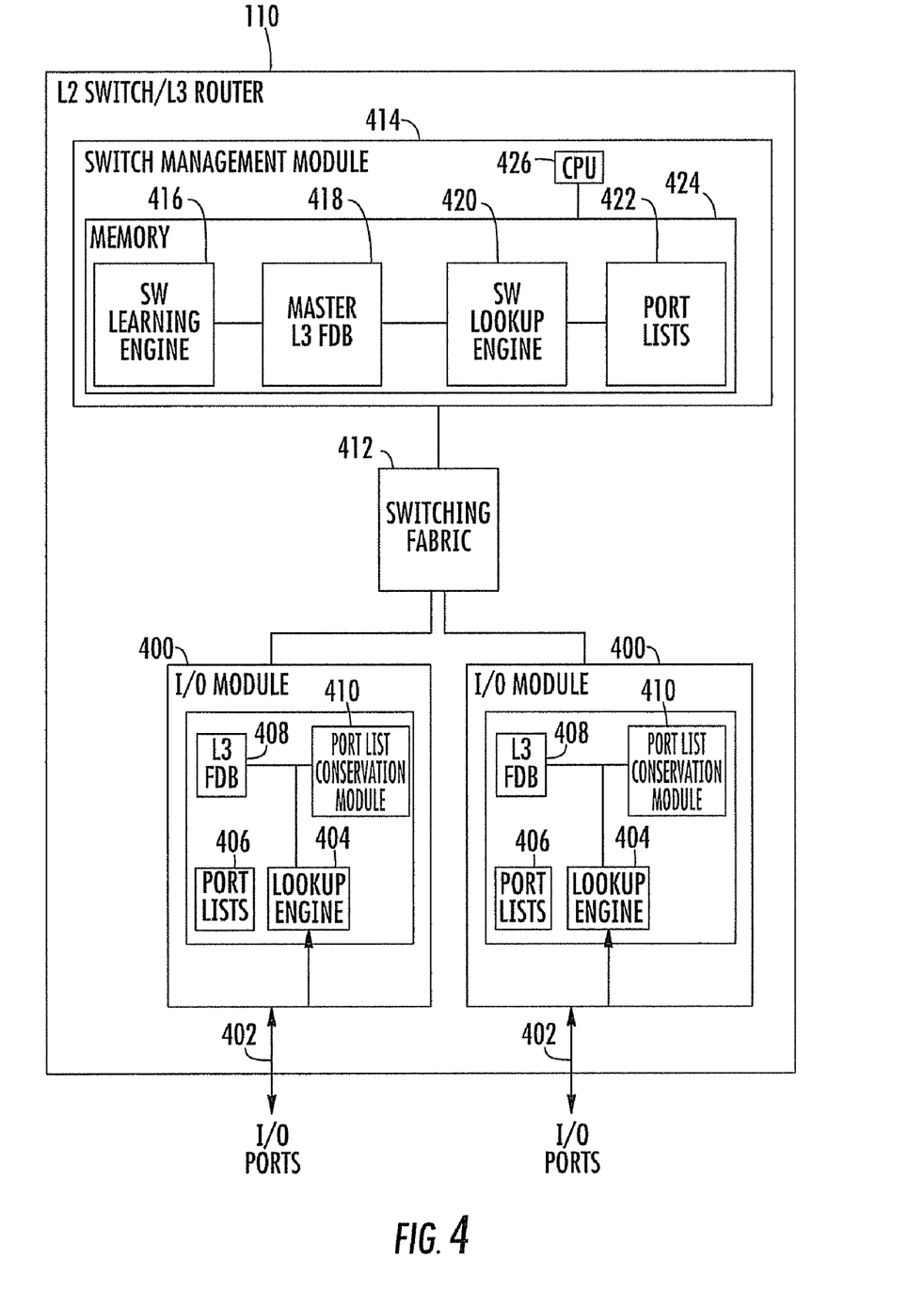
FIG. 4 is a block diagram of an exemplary internal architecture of a layer 3 forwarding device for conserving multicast port lists according to an embodiment of the subject matter described herein.

FIG. 4 is a block diagram of an exemplary layer 3 forwarding device suitable for conserving multicast port lists according to an embodiment of the subject matter described herein. It is appreciated that while the layer 3 forwarding device shown in FIG. 4 represents one possible implementation of a layer 3 forwarding device suitable for conserving multicast port list resources, the subject matter described herein can be implemented other forwarding devices. An example of a commercially available layer 3 packet forwarding device suitable for use with embodiments of the subject matter described herein is the Summit® X450 series switch available from Extreme Networks of Santa Clara, Calif.

Referring to FIG. 4, layer 3 router 110 may forward multicast packets using FDBs and port list data structures implemented in hardware and software. For example, router 110 may include a plurality of input/output (I/O) modules 400 for sending and receiving multicast packets. I/O modules 400 may each include one or more I/O ports 402 for connecting to an external network. In order to perform layer 3 packet forwarding, each I/O module 400 may include a lookup engine 404, a port list data structure 406, and a layer 3 forwarding database 408. Port list data structure 406 includes a plurality of port (or vport) identifiers. Layer 3 forwarding database 408 includes a table of multicast group addresses and, optionally, source IP addresses and/or VLAN identifiers. Lookup engine 404 performs lookups in database 408 based on multicast group addresses and source addresses and/or VLAN identifiers to determine a matching port list in port list data structure 406 to determine where to forward each received packet. Although a single lookup engine 404 is depicted in FIG. 4 for performing layer 3 forwarding lookups, the subject matter described herein is not limited to such an implementation. In an alternate implementation, layer 3 lookup engine 404 may be implemented using separate hardware, software, or firmware components.

Switching fabric 412 switches packets between I/O modules 400 and switch management module 414. Switch management module 414 may include layer 3 software learning engine 416, a master layer 3 forwarding database 418, a software lookup engine 420, and a port list data structure 422, which may be stored in memory 424 and executed by CPU 426.

Learning engine 416 may include routing protocol software for exchanging routing protocol information with other nodes. Therefore, learning engine 416 may add learned entries to master software FDB 418. Master layer 3 forwarding database 418 may include a copy of all of the entries in hardware-based layer 3 forwarding databases 408 maintained by I/O modules 400 as well as any additional entries learned using layer 3 routing protocols implemented by software 416. Software lookup engine 420 may perform lookups in master layer 3 forwarding database 418 for packets received by I/O modules 400 that cannot be forwarded using the layer 3 forwarding data maintained locally by each I/O module ("slowpath" processing). As mentioned above, it is desirable to limit the amount of slowpath processing for packets performed by lookup engine 420 by conserving port list hardware resources 406.

In addition to layer 3 forwarding device implementations, such as that shown in FIG. 4, layer 2 forwarding devices may also be used for implementing multicast port list resource conservation without departing from the scope of the subject matter described herein. For example, a layer 2 forwarding device, such as a layer 2 switch, may examine or "snoop" layer 3 multicast traffic in order to determine when a host wishes to join or leave a multicast group. Thus, the layer 2 snooping of layer 3 protocol traffic provides layer 2 switches with the ability to prune multicast traffic from links that do not contain a multicast listener. A layer 2 switch that does not perform snooping will, by default, flood multicast traffic to all ports in a broadcast domain (e.g., VLAN) thus resulting in unnecessarily forwarding packets to hosts that are not members of a multicast group.

Internet group management protocol (IGMP) is a communications protocol used to manage the membership of Internet Protocol multicast groups by exchanging IGMP messages between IP hosts and adjacent multicast routers to establish multicast group memberships. When a host intends to join a multicast group, the host sends an IGMP report to the multicast router to announce that it is interested in the multicast information addressed to that group. When an IGMP host leaves the multicast group, the host sends an IGMP leave group message to the multicast router.

IGMP snooping is a mechanism operating on layer 2 forwarding devices for constraining traffic sent to multicast groups. Specifically, IGMP snooping allows a layer 2 forwarding device to listen in on an IGMP conversation between hosts and routers to determine changes in multicast group memberships. When a layer 2 switch receives an IGMP report from a host for a given multicast group, the switch may add the hosts port identifier to the multicast table entry for that group. Conversely, when a layer 2 switch receives an IGMP leave message, the switch may remove the host's port identifier from the table entry. IGMP snooping can reduce the bandwidth demanded by multicast traffic from streaming and other bandwidth intensive IP applications. While a switch that does not understand multicast will broadcast multicast traffic to all the ports in a broadcast domain (a LAN), a switch using IGMP snooping will only forward multicast traffic to the hosts interested in that traffic. This reduction of multicast traffic reduces the packet processing at the switch (at the cost of needing additional memory to handle the multicast tables) and also reduces the workload at the end hosts since their network cards (or operating system) will not have to receive and filter all the multicast traffic generated in the network. An example of a commercially available layer 2 packet forwarding device suitable for use with embodiments of the subject matter described herein is the Summit® X450 series switch available from Extreme Networks of Santa Clara, Calif.

Figure 5:
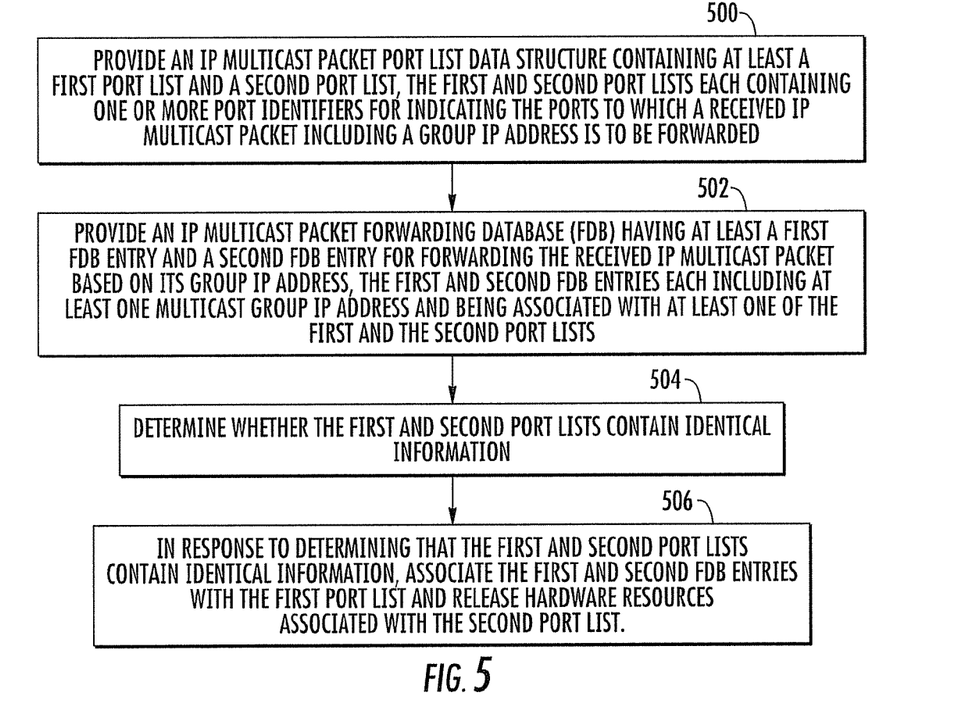
FIG. 5 is a flow chart of an exemplary process for conserving multicast port list resources in a layer 3 forwarding device according to an embodiment of the subject matter described herein.

FIG. 5 is a flow chart of an exemplary process for conserving multicast port lists in a layer 3 forwarding device according to an embodiment of the subject matter described herein. Referring to FIG. 5, at step 500, an IP multicast packet port data structure is provided. The multicast port data structure includes at least a first port list and a second port list, where the first and second port lists each include one or more port identifiers indicating the ports to which a received IP multicast packet is to be forwarded.

At step 502, an IP multicast packet forwarding database (FDB) is provided where the FDB has at least a first FDB entry and a second FDB entry. The first and second FDB entries each include at least one multicast group IP address and are associated with at least one of the first and the second port lists.

At step 504, it is determined whether the first and second port lists contain identical information. For example, port lists 212, 214, and 218 include identical information (i.e., vlan 1, port 1 and vlan 2, port 1). As a result, hardware resources associated with storing port lists 212, 214, and 218 may be inefficiently utilized because three port lists are used to store information that may be included in a single port list.

At step 506, in response to determining that the first and second port lists contain identical information, the first and second FDB entries are associated with the first port list and hardware resources associated with the second port list are released. For example, port lists 212, 214, and 218 include identical port forwarding information and therefore may be combined into a single port list 212 which is associated with FDB entries 202 and 206. Hardware resources associated with port lists 214 and 218 may be released for reuse by another FDB entry. By combining duplicate port lists into the minimum number of non-redundant port lists and releasing hardware resources previously associated with duplicate port list information, port list resources may be conserved, and thus more FDB entries may be added to hardware FDB resources, resulting in faster processing of multicast packets in a layer 2/layer 3 packet forwarding device implementing the subject matter described herein.

While allowing multiple IP multicast FDB entries to be associated with a single port list has the advantages described above, it is desirable that these advantages are not offset by a degradation of other multicast performance metrics. For example, as layer 3 forwarding device 110 receives additional multicast join and leave messages, it may add or remove FDB entries, ports, port lists, and/or change associations between FDB entries and port lists based on these message. Each of these operations require time and resources that may otherwise be used for other important functions performed by layer 3 forwarding device 110. Therefore, in order to maximize exemplary multicast performance metrics such as multicast join and leave latency (i.e., lower is better) and multicast FDB entry learn rate (i.e., faster is better), which may be negatively impacted by associating multiple FDB entries with port lists having common information, the subject matter described herein provides for utilizing a hash table whose entries are associated with common and uncommon port lists.

Figure 6:
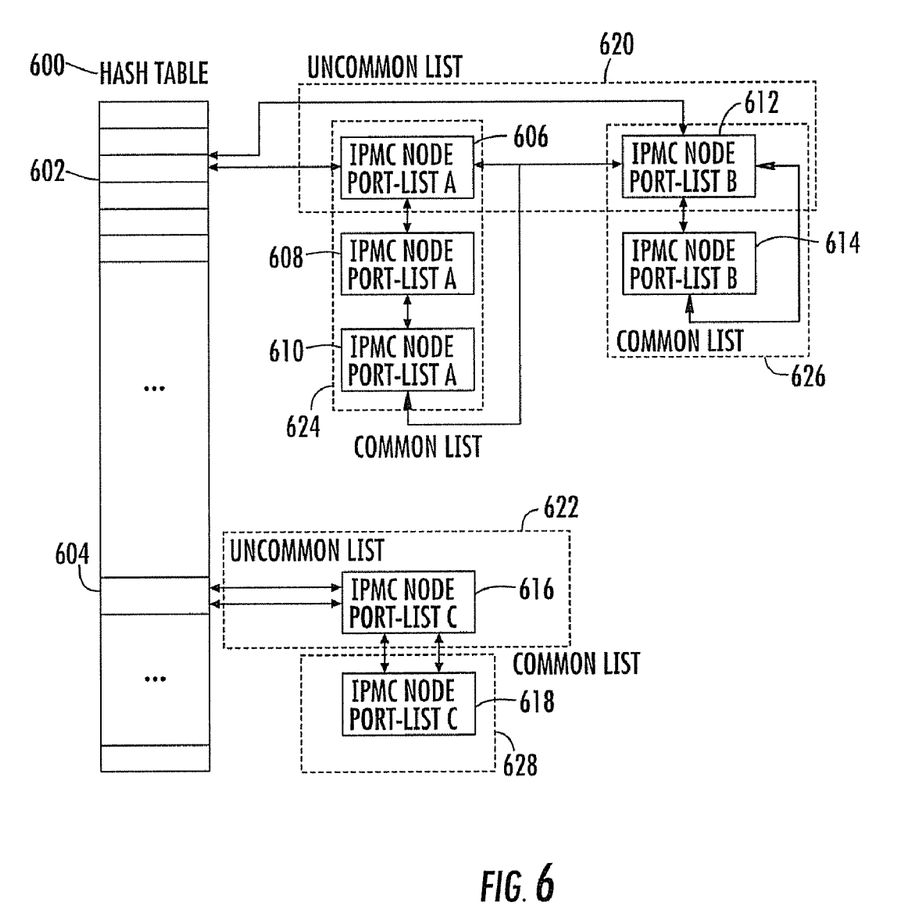
FIG. 6 is a diagram of an exemplary hash table associated with uncommon and common port lists for conserving multicast port list resources according to an embodiment of the subject matter described herein.

FIG. 6 is a diagram of an exemplary hash table having entries associated with common and uncommon port lists according to an embodiment of the subject matter described herein. Hash table may be used instead of a conventional table or other lookup method for associating FDB entries with port lists. Referring to FIG. 6, hash table 600 may include a plurality of hash values associated with a plurality of IP multicast (IPMC) nodes. Hash values in hash table 600 may be produced by inputting a port list into a hash function (not shown). As used herein, a hash function is a mathematical function that converts a large amount of potentially variably-sized data (e.g., port lists) into a smaller data set (e.g., integers) which may be used as indexes into an array or other data structure. For example, port list A may be inputted into a hash function ("hashed") in order to produce hash value 602. Similarly, port list C may be hashed in order to produce hash value 604. It is appreciated that an ideal hash function produces a unique output (hash value) for each input (e.g., port list). However, non-ideal hash functions may produce the same hash value for different inputs (i.e., hash collision). An example of a hash collision is shown in FIG. 6 where port lists A and B both hash to hash value 602. Thus, it is appreciated that port lists A and B both hash to hash value 602, while port list C uniquely hashes to hash value 604. As a result, hash value 602 may include a first pointer that points to IPMC node 606 and a second pointer that points to node 612. In order to resolve hash collisions, each IPMC node having a unique port list for a particular hash value may be searched.

As used herein, an "IP multicast node" or "IPMC node" refers to one or more software elements in a data structure that may contain FDB entry information (e.g., source IP address, multicast group IP address, and ingress VLAN identifier), a software state corresponding to hardware programming, and/or doubly linked list pointers to other IPMC nodes. For example, hash value 602 may be associated with IPMC nodes 606, 608, and 610 which are associated with port list A. IPMC nodes 612 and 614 may also be associated with port list B.

Finally, hash value 604 may be associated with IPMC nodes 616 and 618 and associated with port list C.

IPMC nodes 606-618 may also be associated with a common list or an uncommon list for grouping FDB entries having the same hash value, but either different port lists or the same port list. Thus, an uncommon list refers to a list of one or more IPMC nodes that do not share a same port list. It is appreciated that for each node in an uncommon list, there may be an associated common list. Referring to FIG. 6, uncommon list 620 may include IPMC nodes 606 and 612 associated with port lists A and B, respectively. Similarly, uncommon list 622 may include IPMC node 616 associated with port list C.

A lookup for a port list may be performed by first hashing the port list to obtain a hash value. The hash value may be used to locate an entry in hash table 600. Each entry in hash table 600 may point to a first IPMC node in an uncommon list for that hash value. If there is more than one IPMC node in the uncommon list, the uncommon list may be traversed until a matching port list entry is found. However, it is appreciated that one goal of a hash function used to produce hash table 600 includes reducing the number of hash collisions and thus, reducing the size of uncommon list 606. Thus, for example, a lookup for port list B may include hashing port list B to produce hash value 602. Hash value 602 may then be located in hash table 600 which points to IPMC node 606 as the first node in uncommon list 620. Because IPMC node 608 is not a match (e.g., port list B does not match port list A), the next IPMC node in uncommon list 606 may be examined (i.e., IPMC node 612). The port list associated with IPMC node 612 is a match for port list B and the process is concluded.

A common list refers to a list of two or more IPMC nodes (e.g., FDB entries) that share the same port list. Returning to FIG. 3, FDB entries 202, 206, and 208 may be said to be common to port list 212. Similarly, in FIG. 6, IPMC nodes 606, 608, and 610 may be common to port list A. Thus, port list resources may be conserved by associating multiple IPMC nodes with a common port list.

It may be appreciated that uncommon lists 620 and 622 may be stored in a first hardware structure and common lists 624, 626, and 628 may be stored in a second, separate hardware structure. By separating uncommon and common lists hardware resources and only allocating port list resources for uncommon IPMC nodes, port list resources previously necessary for storing redundant port lists may be conserved. Additionally, although uncommon lists 620 and 622 and common lists 624, 626, and 628 may be shown in FIG. 6 as separate logical entities, they may combined into the same physical storage entity. For example, a first memory (not shown) may store all uncommon lists and a second memory (not shown) may store all common lists.

The process of creating a port list may initially include receiving an IGMP join message including a list of one or more ports to be associated with a particular FDB entry. It is appreciated that a port list may not be populated with multiple port identifiers all at once, but rather may be populated through a series of individual port identifier addition operations. For example, port list A (in its final form) may include ports 1, 2, and 3. Thus, port list A may be created by first adding port 1 to an empty port list containing no port identifiers. Additional port addition operations (e.g., adding port 2 to port 1, then adding port 3 to ports 1 and 2) may be performed until port list A is complete. It is appreciated that the decomposition of port list A into multiple port addition operations is a logical process and therefore may or may not correspond to the actual order in which port identifiers are added to the port list.

According to one embodiment, the hash value (v) may be calculated after each port addition or deletion operation. For example, when an IPMC node is initially created, its hash value may be set to 0. Then, a first hash value (i.e., v1) may be associated with a port list containing port 1 resulting from the logical addition of port 1 to the empty port list. Next, a second hash value (i.e., v2) may be computed for ports 1 and 2 for a port list containing ports 1 and 2 in response to the logical addition of port 2 to the previous port list. While port additions may be used for creating an initial port list, port deletion operations may subsequently be performed in response to receiving IGMP leave messages.

One approach to calculating a hash value in response to a port deletion operation includes calculating a new hash value for the port list. However, because a port deletion operation may often result in the creation of a port list that has previously been hashed, it is desirable to reuse the same hash value for that port list. Specifically, it is appreciated that a sequence of operations resulting in different hash values being associated with a port list containing the same ports depending on the particular sequence of port additions and deletions that produced the port list would be undesirable because the result would be that each port addition or deletion operation would result in an greater than $O(1)$ order of magnitude recalculation. For example, a port list containing ports (1) may hash to hash value 1, while a port list containing ports (1, 2) may hash to hash value 2. Subsequently, a port deletion operation that wishes to remove port 2 from the port list containing ports (1, 2) is received and a new hash value is calculated (hash value 3). Under a naïve approach, two different hash values would be associated with the same port list (e.g., hash value 1 and hash value 3 would both be associated with port list (1)). This would require that the order in which addition and deletion operations were performed be maintained in order to distinguish between multiple hash values for port lists having the same information.

In order to describe a hash function having the desired property that each port addition or deletion operation does not result in a greater than $O(1)$ order of magnitude recalculation, and thus one that is suitable for conserving port lists without degrading other multicast performance metrics, one may assume that:

HV is the name of the hash value function being defined,

N is the set of all non-negative integers,

N×N is the Cartesian product of N with N (i.e., N×N is the set of all ordered pairs of non-negative integers), f:X->Y (i.e., "f maps set X into set Y") represents function f having domain set X and range set Y, p1, p2, and p3 are non-negative integer representations of vports, and HV(p1,p2) denotes the non-negative integer result when the HV function is performed on the ordered pair (p1, p2).

Further, we may define a hash function HV:N×N->N which has the following properties:

HV is commutative: HV(p1, p2)=HV(p2, p1);

HV is self-invertible: HV(HV(v,p1, p1)=v where v may be a previously compared hash value; and HV is associative: HV(HV(p1, p2), p3)=HV(p1, HV(p2, p3)).

The alternate notation HV(p1, p2)=p1+p2 could then be introduced for describing HV function performed on the ordered pair (p1, p2). Some examples of the usage of this notation are inversion (p1+p2)+p2=p1 and association (p1+p2)+p3=p1+(p2+p3). The expression p1+p2+p3 denotes either side of the associative property equation without specifying the HV evaluation order.

A hash function with these properties would meet the requirement that the addition or removal of a port from a port list would result in the same hash values for identical port lists regardless of hash computation order. For example, it can be shown that when vport $p_i$ is removed from a port list containing n ports that:

$p_1+p_2+\ldots+p_i+\ldots p_n+p_i=p_1+p_2+\ldots+p_{i-1}+p_{i+1}+\ldots+p_n$
where $1<=i<=n$.

One function that has the properties listed above is the function XOR:N×N->N which represents the mathematical exclusive OR operation (note that XOR(p1,p2) is expressed as p1 XOR p2 which follows the more general p1+p2 notation in following examples. As used herein, XOR refers to the mathematical exclusive OR operation that results in a value of 1 if and only if exactly one of the operands has a value of 1. For example, 0 XOR 0=0 and 1 XOR 1=1, whereas 0 XOR 1=1. The HV result of the function may be used to identify a hash table entry (e.g., entry 604). For example, the remainder resulting from when the HV result is divided by the size of hash table array 600 may be used as an index into the array 600. Thus, the subject matter herein includes a more efficient algorithm for calculating hash values that provides for a single port addition or deletion operation to result in a O(1) order of magnitude recalculation by reusing hash values for previously hashed port lists, where O(1) indicates that the computational time required is independent of the size of the input. The disclosed algorithm includes XORing the port list and the port to be added or removed, and hashing the result. In embodiments where the port list also includes VLAN identifiers, the VLAN identifiers may also be XORed. It is appreciated that while XOR is one example of a general HV algorithm having the above-described properties being suitable for conserving port lists in a packet forwarding device, other algorithms/mathematical functions may also be used without departing from the scope of the subject matter described herein.

Continuing the example described above, where a first port list includes ports (1,2) and is associated with v1, and a second port list includes ports (1,2,3) and is associated with v2, a port deletion operation for deleting port 3 from the second port list will result in the second port list including ports (1,2). Because ports (1,2) are the same as those included in the first port list, the hash value generated after the deletion operation should be identical to the hash value associated with the first port list (i.e., v1). In other words, v1=v2 XOR port 3. Therefore, it is appreciated that once a hash value has been associated with a particular combination of ports in a port list, no combination of addition or deletion operations will result in a new hash value being assigned.

Whenever a port is added or removed from a port list associated with an IPMC node, three software operations may initially be performed. First, the IPMC node may be removed from the hash table. Second, a new hash value may be calculated and associated with the IPMC node. Third, the IPMC node may be re-added to the hash table either as part of a common list (if other nodes have identical port lists) or as part of an uncommon list and associated with a new hash value (if no other nodes share the same port list).

In addition to the actions performed above whenever a port is added or deleted from an IP multicast node, a check may be performed to determine whether the port addition or deletion results in a node having either an identical port list to another existing port list or no longer sharing a port list with another node. By determining whether a port list is common or uncommon after each change to a port list, the number of port lists stored in the common list may be maximized and the number of port lists stored in the uncommon list may be minimized. Because port lists stored in the common list are not allocated port lists resources like port lists located in the uncommon list (or those located in conventional port list hardware structures), port list resources may be effectively conserved.

As used herein, a "join" operation refers to a set of actions performed in response to determining that a port addition or deletion operation results in an IPMC node having an identical port list to an existing port list. Specifically, a join operation may include updating the FDB entry to point to the existing port list and, if the node has not previously belonged to a shared port list, freeing the hardware resources associated with the old port structure for reuse by future nodes. For example, referring to FIG. 6, if a port addition or deletion operation for IPMC node 614 would result in a transformation of port list B into port list A, then IPMC node 614 may be removed from common list 626 and joined with common list 624. Yet, because IPMC node 614 previously belonged to a shared list (i.e., common list 626), hardware resources associated with the old port structure 614 would not be freed for reuse by future nodes as it otherwise would be if IPMC node 614 were the sole member of an uncommon list.

As used herein, a "split" operation refers to a set of actions performed in response to determining that a port addition or deletion operation results in a node no longer being able to share a port list. Specifically, a split operation may include (1) allocating a new port list structure (2) copying data from the old/shared port list to the new port list (3) updating the FDB entry to use the new port list and (4) using the new port list structure to forward multicast packets. Allocating a new port list structure may include checking against resource constraints to ensure that space for a new port list structure is available. Referring again to the example shown in FIG. 6, if a port addition or deletion operation for IPMC node 618 were to result in transforming port list C into port list D, a split operation would occur. The split operation would include creating a new hash value, if necessary, storing the hash value in hash table 600 and associating the hash value with IPMC node 618. A new uncommon port list structure would be allocated and associated with IPMC node 618. The FDB entry associated for port list D would then be updated to point to the newly allocated port list.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for conserving multicast ports list resources, the method comprising:

at an Internet protocol (IP) packet forwarding device:
storing, in first memory of the IP packet forwarding device, an IP multicast packet port data structure containing at least a first port list and a second port list, the first and second port lists each containing zero or more port identifiers for indicating the ports to which a received IP multicast packet including a group IP address is to be forwarded;
populating the IP multicast port data structure using Internet group management protocol (IGMP) snooping;
storing, in second memory of the packet forwarding device separate from the first memory, an IP multicast packet forwarding database (FDB) having at least a first FDB entry and a second FDB entry for forwarding the received IP multicast packet based on its group IP address, the first and second FDB entries each including at least one multicast group IP address and being associated with at least one of the first and the second port lists;

determining whether the first and second port lists contain identical information;

in response to determining that the first and second port lists contain identical information, associating the first and second FDB entries with the first port list and releasing hardware resources associated with the second port list; and forwarding a first packet by performing a lookup in the IP multicast forwarding database, locating a matching entry in the IP multicast forwarding database, obtaining a pointer to an entry in the IP multicast port data structure, and multicasting the first packet to ports obtained from the entry in the IP multicast port data structure.

2. The method of claim 1 comprising:

determining whether a port addition or deletion operation results in a node having a different port list from both the port list of any other node and itself; and in response to determining that the port addition or deletion operation results in a node having a different port list from its existing shared port list, performing a split operation, wherein the split operation comprises:

allocating a new port list for the node;

copying the contents of the old port list to the new port list;

updating the existing node to use the new port list; and using the new port list to process multicast packets associated with the node.

3. A method for conserving multicast ports list resources, the method comprising:

at an Internet protocol (IP) packet forwarding device:

providing an IP multicast packet port data structure containing at least a first port list and a second port list, the first and second port lists each containing zero or more port identifiers for indicating the ports to which a received IP multicast packet including a group IP address is to be forwarded;

providing an IP multicast packet forwarding database (FDB) having at least a first FDB entry and a second FDB entry for forwarding the received IP multicast packet based on its group IP address, the first and second FDB entries each including at least one multicast group IP address and being associated with at least one of the first and the second port lists;

determining whether the first and second port lists contain identical information;

in response to determining that the first and second port lists contain identical information, associating the first and second FDB entries with the first port list and releasing hardware resources associated with the second port list;

generating a hash value (v) for each of the first and the second FDB entries based on their associated port lists, wherein the hash value is generated using a hash function that is self-invertible, commutative, and associative for all non-negative integer representations of vports, wherein a vport represents a combination of a virtual local area network (VLAN) and a port;

storing the hash values in a node software data structure (node);

inserting the node software data structure in a hash table based on the generated hash value; and maintaining a common list including FDB entries sharing the same port list and hash value.

4. The method of claim 3 comprising:

determining whether a port has been added or deleted from a port list associated with an FDB entry; and in response to determining that a port has been added or deleted, remove the node from the hash table, calculate a new hash value for the node, associate the new hash value with the node, and re-add the node to the hash table.

5. The method of claim 3 comprising:

determining whether a port addition or deletion operation results in node having an identical port list to an existing port list; and in response to determining that the port addition or deletion operation results in a node having an identical port list to an existing port list, performing a join operation, wherein the join operation includes updating the node to use the existing port list and releasing hardware resources associated with the identical port list for reuse by another node if the identical port list is not in use by another node.

6. An Internet protocol (IP) packet forwarding device for conserving multicast ports lists, the packet forwarding device comprising:

first memory in the packet forwarding device storing an IP multicast packet port data structure containing at least a first port list and a second port list, the first and second port lists each containing zero or more port identifiers for indicating the ports to which a received IP multicast packet is to be forwarded, the IP multicast port data structure being populated using Internet group management protocol (IGMP) snooping;

second memory in the packet forwarding device separate from the first memory and storing an IP multicast packet forwarding database (FDB) having at least a first FDB entry and a second FDB entry for forwarding the received IP multicast packet based on its group IP address, the first and second FDB entries each including at least one multicast group IP address and being associated with at least one of the first and the second port lists;

a port list conservation module for determining whether the first and second port lists contain identical information and, in response to determining that the first and second port lists contain identical information, associating the first and second FDB entries with the first port list and releasing hardware resources associated with the second port list; and a lookup engine for forwarding a first packet by performing a lookup in the IP multicast forwarding database, locating a matching entry in the IP multicast forwarding database, obtaining a pointer to an entry in the IP multicast port data structure, and multicasting the first packet to ports obtained from the entry in the IP multicast port data structure.

7. The packet forwarding device of claim 6 wherein the packet forwarding device includes a layer 3 packet forwarding device.

8. The packet forwarding device of claim 7 wherein the layer 3 packet forwarding device includes a multicast router.

9. The packet forwarding device of claim 6 wherein the packet forwarding device includes a layer 2 packet forwarding device.

10. The packet forwarding device of claim 9 wherein the layer 2 packet forwarding device includes an Internet group management protocol (IGMP) snooping-enabled switch.

11. The packet forwarding device of claim 6 comprising at least one uncommon list representing FDB entries that do not share identical port lists within the uncommon list.

12. An Internet protocol (IP) packet forwarding device for conserving multicast ports lists, the packet forwarding device comprising:
    an IP multicast packet port data structure containing at least a first port list and a second port list, the first and second port lists each containing zero or more port identifiers for indicating the ports to which a received IP multicast packet is to be forwarded;
    an IP multicast packet forwarding database (FDB) having at least a first FDB entry and a second FDB entry for forwarding the received IP multicast packet based on its group IP address, the first and second FDB entries each including at least one multicast group IP address and being associated with at least one of the first and the second port lists:
    a port list conservation module for determining whether the first and second port lists contain identical information and, in response to determining that the first and second port lists contain identical information, associating the first and second FDB entries with the first port list and releasing hardware resources associated with the second port list;
    a hash table including one or more hash values (v) computed from the first and second port lists using a hash function that is self-invertible, commutative, and associative for all non-negative integer representations of vports, wherein a vport represents a combination of a virtual local area network (VLAN) and a port;
    at least one common list representing FDB entries sharing the same port list; and
    a hash module for generating a hash value for each FDB entry and storing the hash values in the hash table.

13. The packet forwarding device of claim 12 wherein the at least one common list includes a doubly linked list for pointing to one of the one or more hash values in the hash table and to another FDB entry in the common list having the same hash value.

14. The packet forwarding device of claim 12 wherein the at least one uncommon list includes a doubly linked list for pointing to one of the one or more hash values in the hash table and to another FDB entry in the uncommon list having the same hash value.

15. The packet forwarding device of claim 12 wherein the hash module is further configured to:
    determine whether a port has been added or deleted from a port list associated with an FDB entry; and
    in response to determining that a port has been added or deleted, remove the hash value from the hash table, calculate a new hash value for the node, and associate the new hash value with the node in the hash table.

16. The packet forwarding device of claim 12 wherein the hash module is further configured to:
    determine whether a port addition operation results in an FDB entry having an identical port list to an existing port list; and
    in response to determining that the port addition operation results in an FDB entry having an identical port list to an existing port list, perform a join operation comprising updating the FDB entry to use the existing port list and releasing hardware resources associated with the identical port list for reuse by another node if the identical port list is not in use by another node.

17. The packet forwarding device of claim 12 wherein the hash module is further configured to:
    determine whether a port deletion operation results in a node having a different port list from any exiting port list; and
    in response to determining that the port deletion operation results in an FDB entry having a different port list from any exiting port list, perform a split operation comprising:
    allocating a new port list;
    copying information from the old port list to the new port list;
    updating the existing FDB entry to use the new port list;
    removing the deleted port from the new port list; and
    using the new port list.

18. A non-transitory computer readable medium containing a computer program including computer executable instructions that when executed by the processor of a computer perform steps comprising:
    storing, in first memory of the IP packet forwarding device, an IP multicast packet port data structure containing at least a first port list and a second port list, the first and second port lists each containing zero or more port identifiers for indicating the ports to which a received IP multicast packet including a group IP address is to be forwarded;
    populating the IP multicast port data structure using Internet group management protocol (IGMP) snooping;
    storing, in second memory of the packet forwarding device separate from the first memory, an IP multicast packet forwarding database (FDB) having at least a first FDB entry and a second FDB entry for forwarding the received IP multicast packet based on its group IP address, the first and second FDB entries each including at least one multicast group IP address and being associated with at least one of the first and the second port lists;
    determining whether the first and second port lists contain identical information;
    in response to determining that the first and second port lists contain identical information, associating the first and second FDB entries with the first port list and releasing hardware resources associated with the second port list; and
    forwarding a first packet by performing a lookup in the IP multicast forwarding database, locating a matching entry IP in the multicast forwarding database, obtaining a pointer to an entry in the IP multicast port data structure, and multicasting the first packet to ports obtained from the entry in the IP multicast port data structure.

* * * * *